United States Patent
Carr et al.

(10) Patent No.: US 7,693,087 B1
(45) Date of Patent: Apr. 6, 2010

(54) SELECTION AND OPTIMIZATION OF POTENTIAL HUB CANDIDATES WITHIN A NETWORK

(75) Inventors: Marianne Carr, Overland Park, KS (US); Sarah E. Price, Merriam, KS (US); Derek M. Spain, Olathe, KS (US); Mary Ann Strecker, Grandview, MO (US); Shun Calvin Lai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 446 days.

(21) Appl. No.: 11/674,848

(22) Filed: Feb. 14, 2007

(51) Int. Cl.
*H04L 12/26* (2006.01)

(52) U.S. Cl. .................. 370/252; 370/229; 370/230; 370/235

(58) Field of Classification Search .................. 370/229, 370/230, 235, 238, 238.1, 241, 252, 351, 370/352, 355, 356, 357, 360
See application file for complete search history.

(56) References Cited

U.S. PATENT DOCUMENTS

| | | | | |
|---|---|---|---|---|
| 5,838,660 A | * | 11/1998 | Croslin | 370/216 |
| 2005/0265255 A1 | * | 12/2005 | Kodialam et al. | 370/252 |
| 2007/0204021 A1 | * | 8/2007 | Ekl et al. | 709/223 |

* cited by examiner

*Primary Examiner*—Chi H Pham
*Assistant Examiner*—Weibin Huang (57) ABSTRACT

A method, system, and medium are provided for selecting one or more hub aggregation points from a number of candidates on a network. The method begins by obtaining selection criteria for each of the candidates. Using the obtained criteria a score for each candidate is determined. This determination involves assigning intermediate scores for each criteria and applying a weighted multiplier to the intermediate score. The total of the intermediate scores is the overall score for any candidate. The method continues by selecting potential hub aggregation points for further consideration based upon the determined score of each candidate. The method then calculates a least cost route for each point on the network under consideration to each of the selected hub aggregation points. Different combinations of selected hub aggregation points can then be used to iterate through the least cost routing analysis to arrive at a final selection of hub aggregation points.

16 Claims, 6 Drawing Sheets

| ITEM | CATEGORY | TYPE | LOW RANGE | UP RANGE | SCORE | WEIGHT |
|---|---|---|---|---|---|---|
| HUB TYPE | IMPORTANCE | VALUE | S | S | 3 | 3.333333 |
| HUB TYPE | IMPORTANCE | VALUE | I | I | 2 | 3.333333 |
| HUB TYPE | IMPORTANCE | VALUE | T | T | 1 | 3.333333 |
| HUB TYPE | IMPORTANCE | VALUE |  |  | 0 | 3.333333 |
| TANDEM | IMPORTANCE | VALUE | Y | Y | 3 | 3.333333 |
| TANDEM | IMPORTANCE | VALUE |  |  | 0 | 3.333333 |
| VENDOR QTY | IMPORTANCE | RANGE | 4 | 99999 | 3 | 3.333333 |
| VENDOR QTY | IMPORTANCE | RANGE | 2 | 3 | 2 | 3.333333 |
| VENDOR QTY | IMPORTANCE | RANGE | 1 | 1 | 1 | 3.333333 |
| CLLI QTY | IMPORTANCE | RANGE | 8 | 99999 | 3 | 3.333333 |
| CLLI QTY | IMPORTANCE | RANGE | 3 | 7 | 2 | 3.333333 |
| CLLI QTY | IMPORTANCE | RANGE | 1 | 2 | 1 | 3.333333 |
| SUBTEND EO PCT | IMPORTANCE | RANGE | 100% | 100% | 3 | 3.333333 |
| SUBTEND EO PCT | IMPORTANCE | RANGE | 30% | 99% | 2 | 3.333333 |
| SUBTEND EO PCT | IMPORTANCE | RANGE | 5% | 29% | 1 | 3.333333 |
| SUBTEND EO PCT | IMPORTANCE | RANGE | 0% | 4% | 0 | 4.166667 |
| DS1 QTY | RELEVANCE | RANGE | 29 | 99999 | 3 | 4.166667 |
| DS1 QTY | RELEVANCE | RANGE | 15 | 28 | 2 | 4.166667 |
| DS1 QTY | RELEVANCE | RANGE | 1 | 14 | 1 | 4.166667 |
| DS1 QTY | RELEVANCE | RANGE | 0 | 0 | 0 | 4.166667 |
| SUBTEND DS1 PCT | RELEVANCE | RANGE | 100% | 100% | 3 | 4.166667 |
| SUBTEND DS1 PCT | RELEVANCE | RANGE | 30% | 99% | 2 | 4.166667 |
| SUBTEND DS1 PCT | RELEVANCE | RANGE | 6% | 29% | 1 | 4.166667 |
| SUBTEND DS1 PCT | RELEVANCE | RANGE | 0% | 5% | 0 | 4.166667 |
| MLG TO SWC | RELEVANCE | RANGE | 0 | 0 | 3 | 4.166667 |
| MLG TO SWC | RELEVANCE | RANGE | 1 | 5 | 2 | 4.166667 |
| MLG TO SWC | RELEVANCE | RANGE | 6 | 20 | 1 | 4.166667 |
| MLG TO SWC | RELEVANCE | RANGE | 21 | 99999 | 0 | 4.166667 |
| MAN NODE | RELEVANCE | VALUE | Y | Y | 3 | 4.166667 |
| MAN NODE | RELEVANCE | VALUE |  |  | 0 | 4.166667 |

FIG. 4.

| LATA: | 490 | GET EO INFO | RANK HUB |
|---|---|---|---|
| AVG B/E QTY: | 12 | 520 | |

| LATA | EO CLLI | V | H | CXR CD | CXR NM | EO CAP TYPE CD | MUX (Y/N) | HUB TYP | TDM | VENDOR QTY | CLLI QTY | MAN NODE |
|---|---|---|---|---|---|---|---|---|---|---|---|---|
| 490 | NWORLAMA | 8483 | 2638 | 05183 | BELL SOUTH TELECOM | SL | Y | S | Y | 7 | 17 | Y |
| 490 | NWORLAMT | 8483 | 2654 | 05183 | BELL SOUTH TELECOM | SL | Y | S | Y | 6 | 9 | Y |
| 490 | NWORLAFR | 8475 | 2636 | 05183 | BELL SOUTH TELECOM | SK | Y | I | Y | 1 | 1 | Y |
| 490 | KNNRLABR | 8487 | 2676 | 05183 | BELL SOUTH TELECOM | SJ | Y | T | | 1 | 2 | Y |
| 490 | NWORLAMC | 8480 | 2646 | 05183 | BELL SOUTH TELECOM | SJ | Y | T | | 1 | 1 | Y |
| 490 | KNNRLAHN | 8492 | 2661 | 05183 | BELL SOUTH TELECOM | SJ | Y | T | | 1 | 1 | Y |
| 490 | NWORLASC | 8490 | 2642 | 05183 | BELL SOUTH TELECOM | SJ | Y | T | | 1 | 1 | Y |
| 490 | NWORLASW | 8482 | 2664 | 05183 | BELL SOUTH TELECOM | SJ | Y | T | | 1 | 1 | Y |
| 490 | NWORLARV | 8484 | 2631 | 05183 | BELL SOUTH TELECOM | SK | Y | I | | 1 | 2 | |
| 490 | NORCLAMN | 8504 | 2691 | 05183 | BELL SOUTH TELECOM | SJ | Y | T | | 2 | 2 | |
| 490 | HMNDLAMA | 8407 | 2756 | 05183 | BELL SOUTH TELECOM | SK | Y | T | | 2 | 2 | |
| 490 | LARSLAXA | 8580 | 2654 | 00433 | LAFOURCHE TEL CO | SH | Y | I | Y | 1 | 1 | |
| 490 | HOUMLAMA | 8605 | 2716 | 05183 | BELL SOUTH TELECOM | SK | Y | T | | 1 | 2 | |
| 490 | MNVLLAMA | 8402 | 2675 | 00433 | LAFOURCHE TEL CO | SH | Y | I | | 1 | 1 | |
| 490 | GALNLAXA | 8595 | 2636 | 05183 | BELL SOUTH TELECOM | SK | Y | T | | 1 | 1 | |
| 490 | CVTNLAMA | 8382 | 2691 | 00433 | LAFOURCHE TEL CO | SH | Y | T | | 1 | 1 | |
| 490 | GDISLAXA | 8615 | 2446 | 00438 | RESERVE TEL CO | SH | Y | I | Y | 1 | 1 | |
| 490 | GLMDLAXA | 8609 | 2618 | 05183 | BELL SOUTH TELECOM | SJ | Y | T | | 1 | 2 | |
| 490 | SLIDLAMA | 8395 | 2619 | 05183 | BELL SOUTH TELECOM | SJ | Y | T | | 1 | 2 | |
| 490 | RSRVLAXB | 8500 | 2733 | 05183 | BELL SOUTH TELECOM | SH | Y | T | | 1 | 2 | |
| 490 | NWORLAAR | 8487 | 2623 | 05183 | BELL SOUTH TELECOM | SJ | Y | T | | 1 | 1 | |
| 490 | NWORLABM | 8484 | 2642 | 05183 | BELL SOUTH TELECOM | SJ | Y | T | | 1 | 1 | |
| 490 | NWORLACA | 8486 | 2646 | 05183 | BELL SOUTH TELECOM | SJ | Y | T | | 1 | 1 | |
| 490 | NWORLALK | 8469 | 2643 | 05183 | BELL SOUTH TELECOM | SJ | Y | T | | 1 | 1 | |
| 490 | NWORLAMR | 8494 | 2638 | 05183 | BELL SOUTH TELECOM | SJ | Y | T | | 1 | 1 | |
| 490 | NWORLASK | 8475 | 2627 | 05183 | BELL SOUTH TELECOM | SJ | Y | T | | 1 | 1 | |
| 490 | EDGRLAMA | 8505 | 2730 | 05183 | BELL SOUTH TELECOM | SJ | Y | T | | 1 | 1 | |

*FIG. 5a.*

| DS1 QTY | MSC/POP SWC | SUBTEND EO QTY | SUBTEND EO PCT | SUBTEND DS1 QTY | MLG TO CLOSEST SWC | HUB CANDIDATE | HUB SCORE |
|---|---|---|---|---|---|---|---|
| 180 | Y | 68 | 100% | 1300 | 0 | Y | 98 |
| 130 |   | 68 | 100% | 1300 | 6 | Y | 90 |
| 70 |   | 7 | 10% | 490 | 3 | Y | 66 |
| 30 | Y | 1 | 1% | 30 | 0 | Y | 45 |
| 80 |   | 1 | 1% | 80 | 3 | Y | 45 |
| 60 |   | 1 | 1% | 60 | 5 | Y | 41 |
| 30 |   | 1 | 1% | 30 | 3 | Y | 41 |
| 60 |   | 1 | 1% | 60 | 5 | Y | 41 |
| 15 |   | 11 | 16% | 185 | 3 | Y | 36 |
| 30 |   | 1 | 1% | 30 | 6 | Y | 29 |
| 10 |   | 6 | 9% | 130 | 36 | Y | 28 |
| 15 |   | 1 | 1% | 15 | 31 | Y | 27 |
| 10 |   | 5 | 7% | 120 | 40 | Y | 24 |
| 10 |   | 8 | 12% | 100 | 27 | Y | 24 |
| 60 |   | 1 | 1% | 60 | 36 | Y | 21 |
| 10 |   | 5 | 7% | 50 | 34 | Y | 20 |
| 20 |   | 1 | 1% | 20 | 50 | Y | 17 |
| 20 |   | 1 | 1% | 20 | 41 | Y | 17 |
| 10 |   | 3 | 4% | 30 | 29 | Y | 17 |
| 0 |   | 1 | 1% | 0 | 19 | N | 23 |
| 10 |   | 1 | 1% | 10 | 5 | N | 21 |
| 10 |   | 1 | 1% | 10 | 2 | N | 21 |
| 10 |   | 1 | 1% | 10 | 3 | N | 21 |
| 10 |   | 1 | 1% | 10 | 5 | N | 21 |
| 10 |   | 1 | 1% | 10 | 4 | N | 21 |
| 10 |   | 1 | 1% | 10 | 5 | N | 21 |
| 10 |   | 1 | 1% | 10 | 18 | N | 17 |

FIG. 5b.

SELECTION AND OPTIMIZATION OF POTENTIAL HUB CANDIDATES WITHIN A NETWORK

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Within any network, and specifically telephone networks, there are a variety of potential routes over which a signal can travel. There can be tens of thousands of locations, such as cell towers, handling signals that need to be eventually routed to a point of contact with a provider's network. It is, of course, possible to directly route the signals from each location back to the point of contact. For example, in theory, each cell tower could be directly routed back to a Mobile Switching Center (MSC). This approach would be expensive, as each line used has an associated cost.

It is therefore desirable to aggregate locations before routing the signal back to the MSC. Current network design does utilize the concept of aggregating locations into a number of hubs to lower the number of lines needed. The current network design does not, however, systematically approach the concept of hub selection. Rather than a formal process, the current network design process involves institutional knowledge about the various locations and is basically a trial-and-error process. Using current network design, there is little data supporting the selection and analysis of aggregation hubs, so one cannot be sure that one potential route through the network is any better than another.

It would be desirable to have and utilize a system that identifies the best potential hub aggregation locations throughout a network and that can analyze the cost implications associated with selected hubs and routes for the signals. Such a system should allow a network planner to order a minimum number of lines and to use the ordered lines most effectively.

SUMMARY

The present invention is defined by the claims below. Embodiments of the present invention solve at least the above problems by providing a system and method for, among other things, selecting a hub, or network aggregation point, from among a great number of possible candidates within a given network under consideration. The present invention has several practical applications in the technical arts including the improved planning of network configurations by network planners to optimize any particular network under consideration.

In a first aspect, a set of computer-useable instructions are used to execute a method for selecting one or more hub aggregation points from a number of candidates on a network under consideration. The method begins by obtaining selection criteria for each of the candidates. These candidates in a telecommunication network are end offices. Using the obtained criteria a score for each candidate is determined. This determination involves assigning intermediate scores for each criteria and applying a weighted multiplier to the intermediate score. The total of the intermediate scores is the overall score for any candidate. The method continues by selecting potential hub aggregation points for further consideration based upon the determined score of each candidate. The method then calculates a least cost route for each point on the network under consideration to each of the selected hub aggregation points. Different combinations of selected hub aggregation points can then be used to iterate through the least cost routing analysis to arrive at a final selection of hub aggregation points.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 5*a* is an exemplary screen display showing obtained candidate information and the results of the hub selection.

DETAILED DESCRIPTION

Embodiments of the present invention provide systems and methods for selecting a hub, or network aggregation point, from among a great number of possible candidates within a given network under consideration. This allows network planners to methodically analyze the many different possibilities and design a network that most efficiently utilizes the available network locations for aggregation. This allows the overall cost of the network to be minimized as much as possible given the network locations under consideration.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| EO | End Office |
| LATA | Local Access and Transport Area |
| CLLI | Code Common Language Location Identifier |
| MSC | Mobile Switching Center |
| POP | Point of Presence |
| DS1 | Digital Signal, level 1 |
| DS3 | Digital Signal, level 3 |
| LERG | Local Exchange Routing Guide |
| NECA | National Exchange Carrier Association |

Further, various technical terms are used throughout this description. A definition of such terms can be found in *Newton's Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
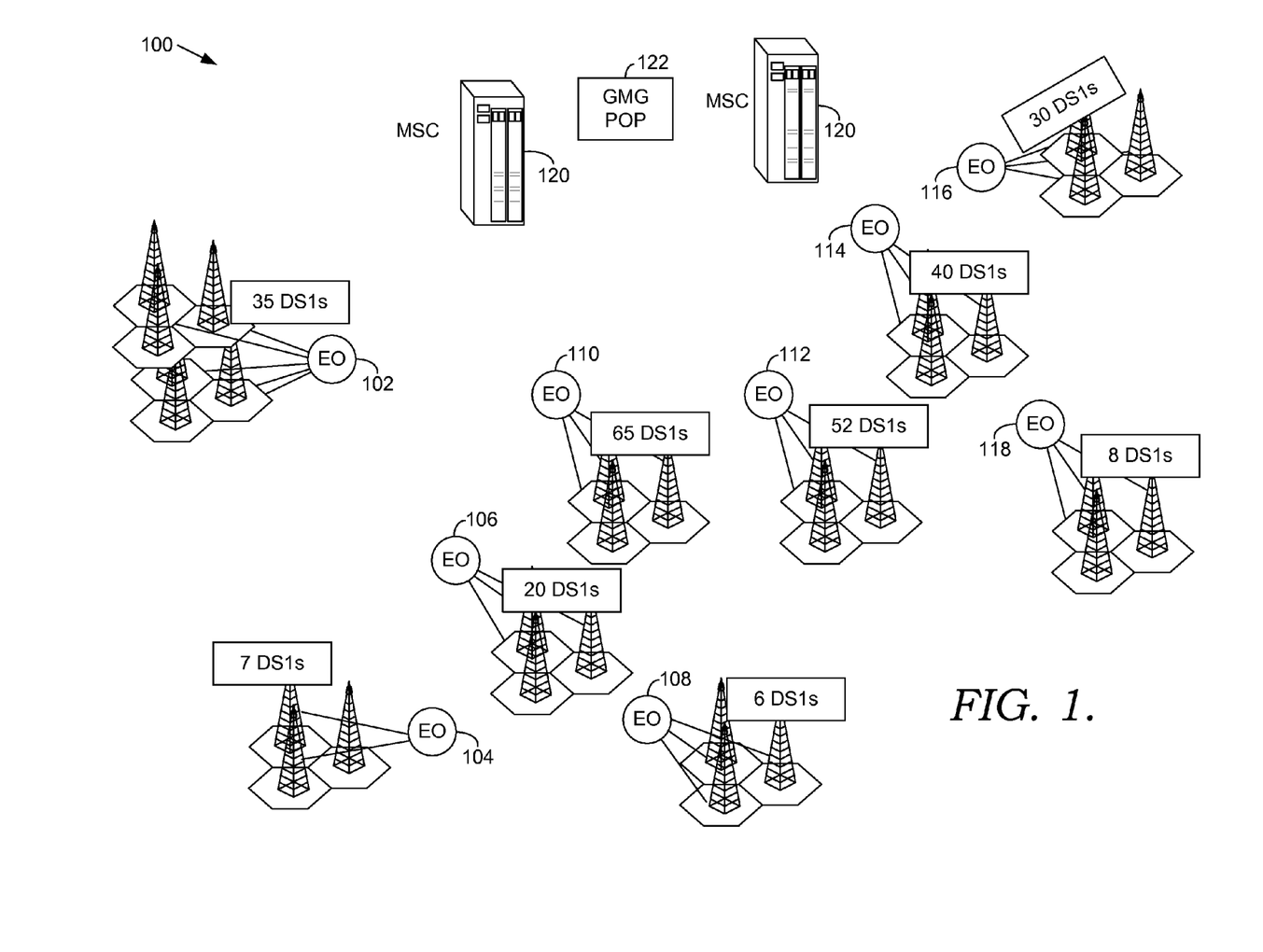
FIG. 1 is a schematic illustration of an exemplary network before any optimization.

As shown in FIG. 1, a general cellular network 100 typically involves a number of end offices (EO) labeled 102-118 that each have a number of cell towers and DS1 lines associated with them. The signaling eventually must be routed back to an MSC 120 and/or the POP 122. The difficulty, as stated above, is how best to optimize the network 100 using the most cost-effective aggregation points and line capacities. It should be understood that while a telecommunications network is illustrated and discussed, the invention is not limited to a telecommunications network.

Figure 2:
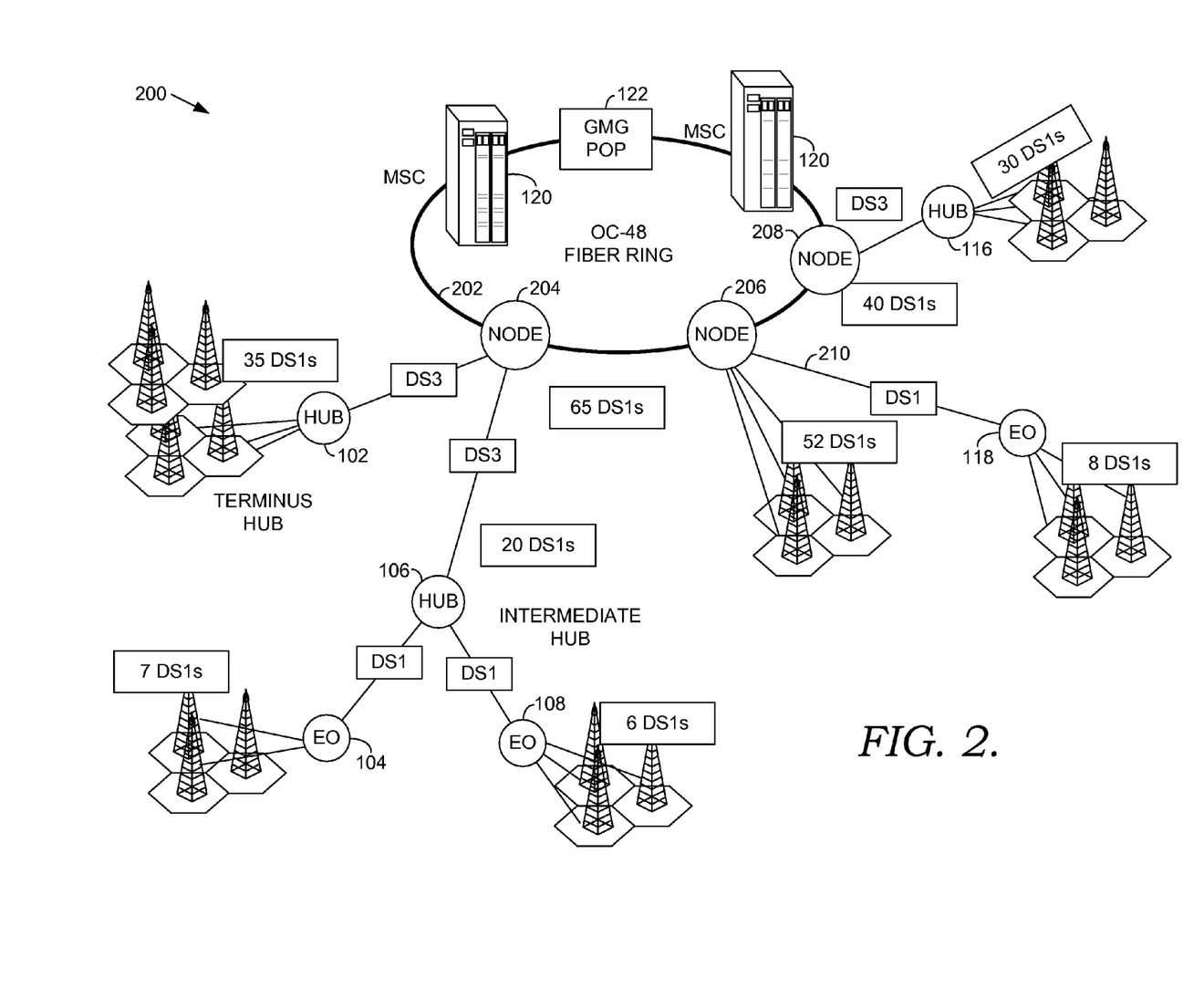
FIG. 2 is a schematic illustration of the exemplary network of FIG. 1, after optimization.

Using the method and system of the invention, the network 100 can be optimized. An example of this optimization is shown in FIG. 2. FIGS. 1 and 2 are merely shown to illustrate the difference between a non-optimized network and an optimized network. As will be more clear after the discussion below, the optimized network can take on any of a variety of configurations based upon a number of factors associated with the components of the network. As shown in FIG. 2, the optimized network 200 has a number of different aggregation points. More specifically, the network 200 may involve a high capacity OC-48 fiber ring 202 that couples MSCs 120, POP 122 and nodes 204-208. Note that the EOs 110, 112 and 114 of FIG. 1 are serving as nodes 204-208 on the fiber ring 202 of FIG. 2. The remaining EOs of FIG. 1 are routed to the POP 122 and MSCs 120 through one of the nodes 204-208 and through the fiber ring 202. This can be accomplished using a DS1 line, such as the DS1 line 210 from EO 118. Alternatively, capacity and cost may dictate that a higher capacity, higher cost DS3 line be used to couple the EO to the node on the fiber ring 202. An example of this configuration is illustrated as EO 116 or EO 102 of FIG. 1 being used as a hub and being coupled to nodes 208 and 204, respectively, on the fiber ring 202. Yet another configuration is illustrated as EO 104 and EO 108 are routed to EO 106 using DS1 lines, making EO 106 an intermediate hub. EO 106 is then coupled to node 204 on the fiber ring 202 with a DS3 line.

After optimization, the signaling from the various end offices of FIG. 2 is routed back to the MSCs and POP in a manner that best utilizes the capabilities of the end offices, the available bandwidth and the money required to obtain that bandwidth. In theory, it might be possible to calculate the best configuration for the network and consider each EO as a potential hub candidate. In practice, however, such a calculation across a wide network would be unduly burdensome and time consuming due to the number of end offices and the size of most networks. It is therefore necessary to narrow the list of end offices that could potentially serve as a potential hub or aggregation point.

Figure 3:
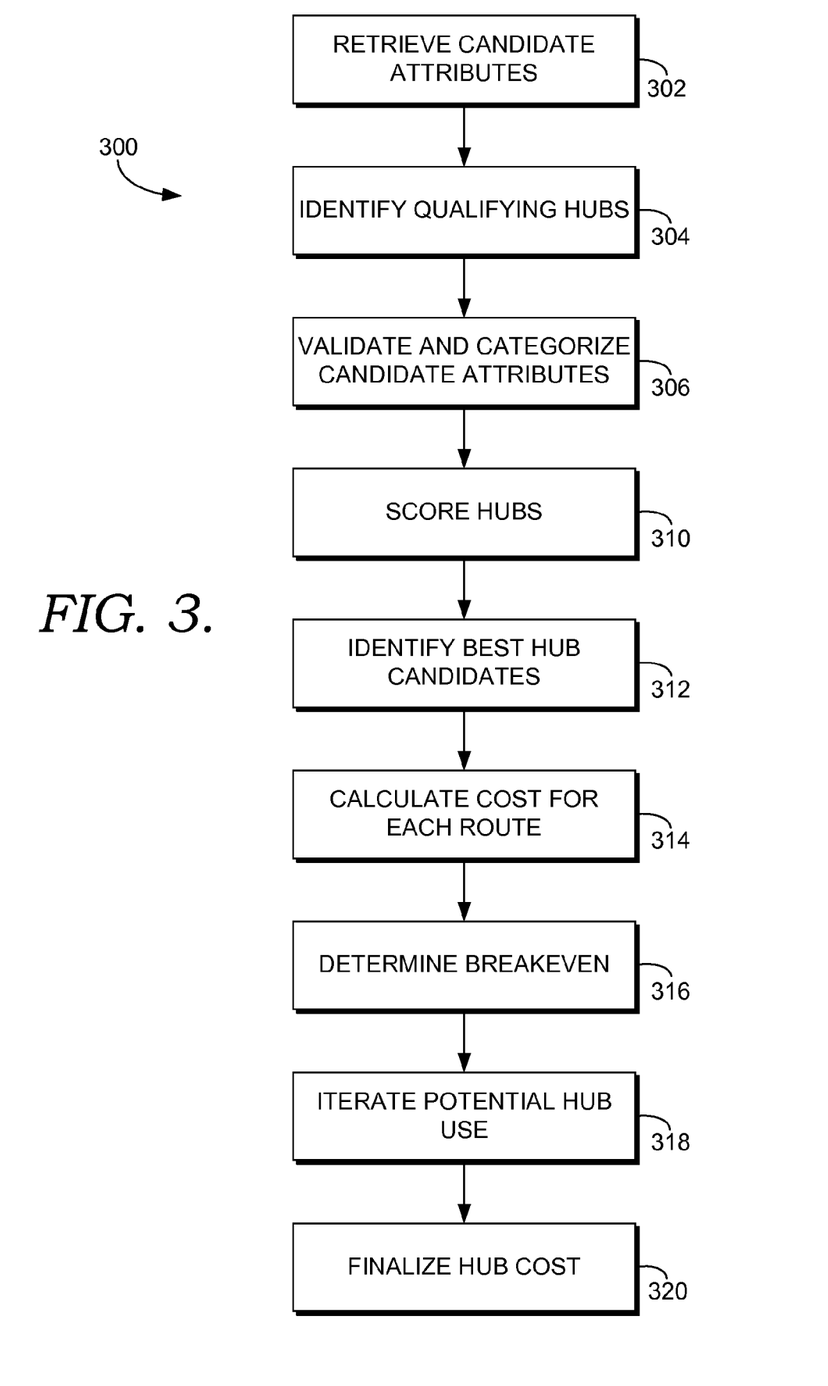
FIG. 3 is a flow diagram illustrating the method of hub selection and optimization.

Turning to FIG. 3, a method of determining optimal end office use as a hub is illustrated and generally designated as 300. Each EO in a LATA is initially considered as a candidate for hub selection. For each candidate, as shown at 302, the method begins by retrieving certain attributes of each candidate. The candidate attributes can be retrieved from database sources such as the LERG and NECA databases. Once the attributes have been retrieved, the method continues by identifying qualifying hubs, as shown at 304. In order to be further considered as a hub, the candidate must possess certain qualifying attributes. As an example, to qualify as a hub, the method may require a candidate to have certain capabilities, such as supporting a 3/1 multiplexer. As another example, to qualify as a hub, the method may require that the number of circuits served by the candidate be greater than the breakeven number. The breakeven number is discussed in more detail below. For each candidate possessing the qualifying attributes, the method continues by validating and categorizing candidate attributes, as shown at step 306. In step 306 candidate data is obtained, preferably in large part automatically from database sources, and validated by the user, and additional information can also be provided by the user. This additional data could be, for example, other industry public data and/or network specific data. The obtained information is categorized into either the importance or relevance categories. This validation and categorization of additional data is performed by the user in one embodiment. The candidates are then given a normalized score using a hub ranking algorithm, as shown at step 310 and as further described in an example below. Based upon the scores of the candidates, the method identifies the best potential hub candidates as shown at 312.

For each identified candidate from step 312, the method calculates a cost for each potential route, as shown at 314. This calculated cost includes the cost for each EO to be routed through the candidate if the candidate were used as a hub in the network. This cost is calculated assuming both a DS1 line use and a DS3 line use. The input for this calculation is the circuit route data, including such things as the carrier, zone, price flex and meetpoint (available from the LERG and NECA databases) as well as any business rules based on predefined tariff product attributes and rate specifications. The output is a calculated rate cost. This calculation can be performed by a costing tool that calculates the rate cost given the identified input. The tool is preferably table driven so that it is flexible to allow for changes and so that it is scalable for expansion. Using this calculation, a network planner can perform a least cost routing analysis at both the DS1 and DS3 level that identifies the hub having the least cost for each particular end office.

The method continues by determining the DS3 breakeven number and identifying those hub candidates that do not meet the breakeven number, as shown at 316. Typically, a DS3 line carries with it a higher cost than a DS1 line, because it has a higher capacity. But in order to justify the additional cost of a DS3 line, a hub candidate must carry enough capacity to offset the additional cost. This is the breakeven number. Any hub candidates that do not justify a Ds3 line are eliminated from consideration as a hub. These candidates will merely connect to another hub (such as EO 108) or directly to a node (such as EO 118). The remaining candidates are the final candidates for consideration. Using these candidates, the method iterates through each by "turning off" potential candidates from consideration and calculating a network cost, as shown at 318. A final network cost using the optimal candidates as hubs is then calculated, as shown at 320.

As discussed above with respect to step 310, the method uses a hub ranking algorithm to score each hub candidate. A number of factors are used in this algorithm. The factors can generally be divided into two broad categories, namely importance and relevance. Importance is the strategic importance of the candidate in its own right, apart from considerations specific to the network under consideration. Relevance is the strategic value of the candidate with respect to the network under consideration. Candidates that rate higher in importance generally are larger and have more supporters, while those that rate higher in relevance are of particular interest to the carrier associated with the network under consideration.

The criteria under the importance category include the size, scope, interest and specialty values of a candidate. The size is simply the number of subtending locations that the candidate can support. In other words, how many other end offices can be routed to and through the candidate location. Within a telecommunication network, the size can be defined by the hub type of the candidate. Generally there are three types of hubs: super, intermediate and terminus. A super hub can handle the most subtending locations. EOs 110, 112 and 114, which are shown as nodes 204, 206 and 208, are examples of super hubs. An intermediate hub can handle some subtending locations, but fewer than a super hub. EO 106 is an example of an intermediate hub. A terminus hub cannot handle any subtending locations. EOs 102 and 118 are examples of terminus hubs. Therefore, a super hub would rank highest in importance, followed by intermediate hubs and terminus hubs.

The scope is the percentage of other locations within the geographical area of the candidate that the candidate can potentially support. The determination of scope involves finding the percentage of end offices within a particular area that the candidate location can support. Therefore, a candidate that could support ten of fifteen end offices within a LATA of interest would be more important in scope than a candidate that could support ten of one hundred end offices within a LATA. Interest is simply the amount of interest from others in the candidate location and the specialty value involves a determination of whether the candidate possesses any unique features that may add value. If other companies exhibit an interest in the candidate location, the importance value of the candidate rises. To determine this interest for a telecommunications network, the number of colocations of a candidate location can be used. Colocation occurs when one company locates its switches within another company's end office. When a company does so, a CLLI identifier ("silly code") is created to uniquely identify the equipment present in the location. This information is published and is publicly available so the interest in a candidate location can be determined. Within a telecommunications network, one specialty feature that increases a candidate's importance is the presence of tandem switching equipment. A tandem switch allows other network elements to work together such as connecting end offices to other end offices or to other lesser switches. Therefore, if a candidate end office has a tandem switch, it is more important.

The criteria under the relevance category include the amount of traffic that can be routed through the candidate location, the distance between the candidate location and regional aggregation points of the network, the candidate location relative to existing critical network locations and any other special arrangements concerning the candidate, such as the cost, speed or contractual issues. The amount of traffic criteria is measured with respect to the network under consideration. This is the number of circuits of a network that can be routed to the hub, including subtending locations. This can also be expressed as a percentage of the current demand of a network that can be routed through a particular candidate location. A higher percentage means that the candidate location is more relevant. The distance criteria in a telecommunications network is the distance from the candidate to the POP and/or MSC. The closer a candidate is to the POP and/or MSC, the more relevant. The location criteria is the location of the candidate relative to critical network locations. For example, a critical network location could be a carrier hotel or a node on the fiber ring 202. Another critical network location consideration is whether the candidate is a MAN node of the network under consideration. A MAN node is a metropolitan area network that is a high-speed data intra-city network linking multiple locations. The closer the candidate is to these critical network locations, or if the candidate is one of the critical network locations, the more relevant the candidate is to the network under consideration. Under the special arrangements criteria, any hub candidate constraints are considered. Within any local calling network, different providers are present and each has different costs, contracts, etc. These may influence the relevance of a candidate to the network under consideration.

Figure 4:
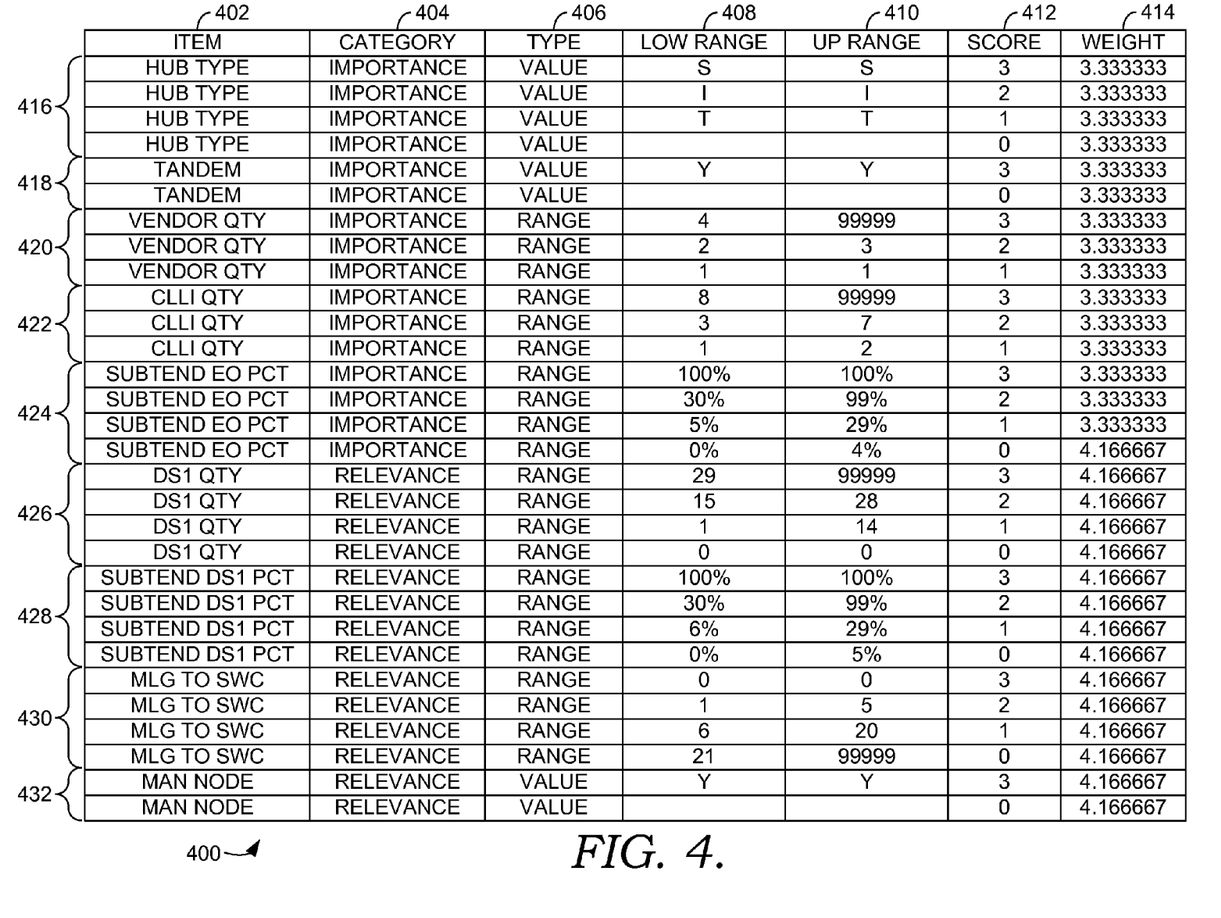
FIG. 4 is an exemplary hub scoring criteria table.

A sample hub scoring criteria template 400 is shown in FIG. 4. While the template is discussed in detail below, it should be understood that other scores and weights can be given to the various criteria, and that the scores and weights are merely one example. The template shown includes column 402 identifying the criteria, column 404 identifying the category, column 406 identifying the type of data, columns 408 and 410 identifying the lower end and upper end of any range, column 412 identifying the score associated with a particular value or range and column 414 identifying a relative weight for the score.

The first four rows of template 400 list values for different hub types within the importance category as shown at 416, under the size criteria. The hub types can be either super (S), intermediate (I) or terminus (T). As can be seen in FIG. 4, the super hub receives the highest score, followed by intermediate and terminus hubs. Note that if a candidate does not qualify, it will not be one of the above hub types and will receive a zero score. The next two rows, shown as 418, list values reflecting whether the candidate is a tandem switch under the specialty category. If so, it receives a score of three, if not, it receives a score of zero.

The next six rows in the importance category relate to the interest criteria. The first three of these rows, shown as 420, indicate the number of vendors at a particular candidate location. As shown, those candidates with a range of vendors 4 or over are given a score of three. Candidates having two or three vendors are given a 2, and those with only one vendor are given a score of one. The next three rows in the interest criteria, shown as 422, indicate the number of different pieces of equipment present at the candidate location. As shown, those candidates having eight or more different pieces of equipment are given a score of three. Candidates having between three and seven different pieces of equipment are given a score of 2, and those candidates that have one or two different pieces of equipment are given a score of 1.

The last criteria shown in FIG. 4 under the importance category is the scope category, measured as the subtending end office percentage, and shown at 424. If a hub candidate can handle all of the end offices within a particular area, then it will receive a score of three. If the candidate can handle between thirty and ninety-nine percent of the end offices within a particular area, the candidate will receive a 2. If the candidate can handle between five and twenty-nine percent of the end offices, it will receive a 1, and if the candidate can handle less than five percent, it will receive a score of zero. Note that in the template of FIG. 4, all of the criteria under the importance category are given a weight of three and one-third.

With continued reference to FIG. 4, the first four rows in the relevance category are shown as 426. The first criteria shown relates to the amount of traffic of the network under consideration that can be routed through the candidate location, as measured in the number of DS1 lines that can be so routed. As shown, candidates that can accommodate over twenty-nine DS1 lines are given a score of 3. If a candidate can accommodate between fifteen and twenty-eight DS1 lines, it is given a score of 2, and if a candidate can accommodate between one and fourteen DS1 lines it is given a score of 1. If a candidate cannot accommodate a DS1 line of the network under consideration, it is given a score of zero. The next four rows under the relevance category are indicated at 428 and relate to the amount of network traffic of the network under consideration that can be routed through the candidate. In contrast with rows 426, rows 428 measure the percentage of subtending DS1 lines for the calling area of the network under consideration that can be routed through the candidate. As shown, a candidate that can handle all of the DS1 lines for the calling area is given a score of 3. If a candidate can handle between thirty and ninety-nine percent of the network traffic, it is given a score of 2. If a candidate can handle between six and twenty-nine percent of the DS1 lines for a particular calling area, it is given a score of 1. Any candidate that is capable of handling less than five percent of the network traffic for the particular area is given a score of zero.

The next four rows under the relevance category relate to the distance between the candidate and any regional aggregation point, and are designated as 430. The distance is measured in miles. If a candidate is a regional aggregation point, or is very close to a regional aggregation point, the distance is zero miles and the candidate receives a score of three. If a candidate is between one and five miles from a regional aggregation point, it is given a score of 2. If the candidate is between six and twenty miles from a regional aggregation point, it is given a score of 1 and if the candidate is more than 21 miles from a regional aggregation point it is given a score of zero. The last two rows in the relevance category are shown at 432 and are used to designate whether a node is a MAN node, which would be a special consideration. If the candidate is a MAN node for the network under consideration, it is give a score of three, if not, it is given a score of zero. For each of the rows and scores under the relevance category, a weight of four and one sixth is applied.

As stated above, at the beginning of the discussion of FIG. 4, it is important to understand that the particular ranges, scores and weights shown in FIG. 4 are merely exemplary. Other ranges, scores and weights can be used and still be within the scope of the present invention. Additionally, more or less criteria can be applied and used within the scoring template.

Figure 5B:
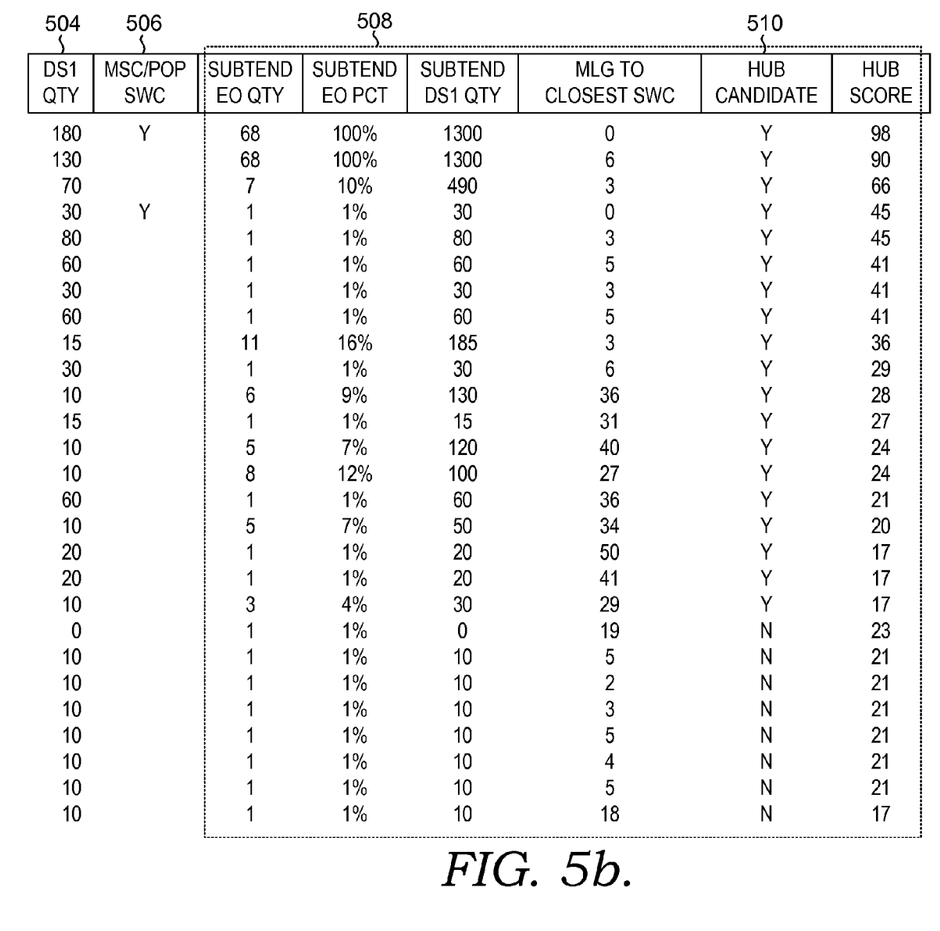
FIG. 5*b* is a continuation of the exemplary screen display of FIG. 5*a*.

An example applying the initial steps of FIG. 3 through the hub ranking algorithm is shown in FIGS. 5a and 5b. As shown in FIGS. 5a and 5b, the hub analysis can be performed for a particular LATA. The LATA used in the example of FIGS. 5a and 5b is identified with an ID number, such as "490." The initial step 302 is preferably performed by a computer program when a user selects the "Get EO Info" control 520. In selecting the control button 520, the fields indicated by the dotted line 502 are populated. These fields include the LATA identifier, the EO location (EO CLLI, coordinates V and H), carrier code and name, hub type, multiplexer capability, whether an EO has a tandem switch, the vendor quantity (collocation) and equipment quantity (CLLI quantity) and whether the candidate is a MAN node for the network under consideration. Having obtained this information, the qualifying hubs are identified per step 304 of FIG. 3. For qualifying hubs the subtend information is obtained, as shown in column 504 (FIG. 5b) and any MSC/POP candidates are identified as shown in column 506. Using the above information, the hub scores for each location are calculated as shown in the fields surrounded by line 508. These calculations include calculating the subtending EO quantity and percentage, the subtending DS1 quantity and percentage, the mileage to the closest serving wire center (SWC) and an overall hub score. The hub candidates are identified from the list of candidates, as indicated in column 510. The hub candidates can then be further narrowed by identifying the best hub candidates using the hub scores, per step 312 of FIG. 3. In the example shown in FIG. 5, the best hub candidates might be those with a hub score above a forty.

Using the above hub candidate analysis method and system, it can be seen that the number of hubs identified for further consideration is considerably smaller than the total pool of EOs and even hub candidates. This allows a more thorough examination of the identified hubs, and their costs, when used in the network under consideration.

For each of the candidates identified for further consideration, the remaining steps 314-320 are performed. To do so, a computer module is utilized to set up a matrix representing all possible route choices between the originating locations of the LATA and the identified hub candidates. The cost of each route is then calculated and the least cost route for each originating location is determined. The breakeven number is calculated and any hub candidates not meeting the breakeven number are eliminated and the route costs are recalculated with the non-breakeven hub eliminated from consideration. Following the breakeven analysis, the final hub candidates are determined, as are the final routes based upon the least cost route for each originating location.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of selecting one or more hub aggregation points from a number of candidates on a network under consideration, the method comprising:

obtaining selection criteria for each candidate, the criteria including the importance and relevance of each candidate;

determining a score for each candidate based upon the obtained criteria; and selecting potential hub aggregation points for further consideration based upon the determined score of each candidate, wherein the importance information includes one or more of the hub type of the candidate, the number of vendors at the candidate, the number of different pieces of equipment at the candidate, the percentage of locations in the network that the candidate can support and whether the candidate has a tandem switch.

2. The computer-readable media of claim 1, wherein the candidate selection criteria includes both absolute criteria and criteria relative to the network under consideration.

3. The computer-readable media of claim 2, wherein the determining step applies a selected weight to each criteria.

4. The computer-readable media of claim 3, the method further comprising calculating a least cost route for each point on the network under consideration using the selected potential hub aggregation points.

5. The computer-readable media of claim 2, wherein the obtaining of selection criteria includes both data obtained from a database and results calculated using the data obtained from a database.

6. The computer-readable media of claim 4, the method further comprising iterating least cost route calculations for each point on the network under consideration using only selected ones of the potential hub aggregation points.

7. One or more non-transitory computer-readable media having computer-useable instructions embodied thereon for performing a method for selecting one or more network aggregation points from a number of candidates on a network under consideration, the method comprising:

obtaining information regarding the importance and relevance of each candidate, the relevance information including one or more of the number of circuits in the network that can be routed to the candidate, the percentage of circuits in the network that can be routed to the candidate, the distance to a serving wire center and whether the candidate is a MAN node of the network;

calculating a score for each candidate based upon the obtained importance and relevance information; and selecting potential network aggregation points for further consideration based upon the calculated score of each candidate.

8. The computer-readable media of claim 7, wherein the network is a telecommunications network.

9. The computer-readable media of claim 8, wherein the importance information includes one or more of the hub type of the candidate, the number of vendors at the candidate, the number of different pieces of equipment at the candidate, the percentage of locations in the network that the candidate can support and whether the candidate has a tandem switch.

10. The computer-readable media of claim 1, wherein the relevance information includes one or more of the number of circuits in the network that can be routed to the candidate, the percentage of circuits in the network that can be routed to the candidate, the distance to a serving wire center and whether the candidate is a MAN node of the network.

11. The computer-readable media of claim 8, the method further comprising calculating a least cost route for each point on the network under consideration using the selected potential network aggregation points.

12. The computer-readable media of claim 11, the method further comprising iterating least cost route calculations for each point on the network under consideration using only selected ones of the potential hub aggregation points.

13. The computer-readable media of claim 12, wherein the obtaining of information includes both data obtained from a database and results calculated using the data obtained from a database.

14. One or more non-transitory computer-readable media having computer-useable instructions embodied thereon for performing a method for selecting points of aggregation on a network, considering each of a number of possible candidates, comprising;

receiving data relating to each of the number of possible candidates, the data including the importance and relevance of each candidate;

applying a scoring template to the received data to determine a score for each of the number of possible candidates;

ranking the determined scores; and based upon the ranked scores, selecting a portion of the number of possible candidates to serve as points of aggregation on the network, the portion being a range of the top-ranked candidates, wherein the importance information includes one or more of the hub type of the candidate, the number of vendors at the candidate, the number of different pieces of equipment at the candidate, the percentage of locations in the network that the candidate can support and whether the candidate has a tandem switch.

15. The computer-readable media of claim 14, wherein the network is a telecommunications network.

16. The computer-readable media of claim 15, wherein the applying step includes calculating intermediate scores for each of the candidates based upon the received data for each of the candidates.

* * * * *